United States Patent [19]

Balzer et al.

[11] 4,226,072

[45] Oct. 7, 1980

[54] APPARATUS FOR APPLYING A FILM LID TO A CUP

[76] Inventors: Winton E. Balzer, 963 Central Ave., Needham, Mass. 02192; Kenneth M. Knobel, 37 Percy Rd., Lexington, Mass. 02173

[21] Appl. No.: 966,876

[22] Filed: Dec. 6, 1978

[51] Int. Cl.³ .......................... B65B 7/28; B67B 3/04; B65B 51/14
[52] U.S. Cl. ........................................ 53/298; 53/373
[58] Field of Search ............... 53/296, 297, 298, 329, 53/373, 389, 76; 242/75.2; 226/195

[56] References Cited

U.S. PATENT DOCUMENTS

| | | | |
|---|---|---|---|
| 1,445,022 | 2/1923 | Kimball | 242/75.2 |
| 3,507,093 | 4/1970 | Marion | 53/296 X |
| 3,618,293 | 7/1971 | Loewenthal | 53/296 |
| 3,703,066 | 11/1972 | Marion et al. | 53/329 X |
| 3,716,963 | 2/1973 | Amberg | 53/296 |
| 3,783,582 | 1/1974 | Willvonseder | 53/329 X |
| 4,078,360 | 3/1978 | Balzer et al. | 53/296 X |
| 4,092,817 | 6/1978 | Rist | 53/298 |
| 4,134,248 | 1/1979 | Freeman | 53/298 |

Primary Examiner—Horace M. Culver
Attorney, Agent, or Firm—Morse, Altman, Oates & Bello

[57] ABSTRACT

Apparatus is provided for automatically applying a lid comprised of a film of thermoplastic sheet material to the top of a cup. The film is supplied in a roll and the leading end is fed into a position between the top of the cup and a heat sealing head. In an operating cycle of the apparatus, the cup is brought up against the film and the heat sealing head is brought down on top of the film to seal the film to the cup and sever the forward section of the film from the roll. A film stabilizer is provided on the film feed mechanism for maintaining control of the film and a pneumatic circuit provides an automatic control of the functional components in predetermined timed sequence.

2 Claims, 5 Drawing Figures

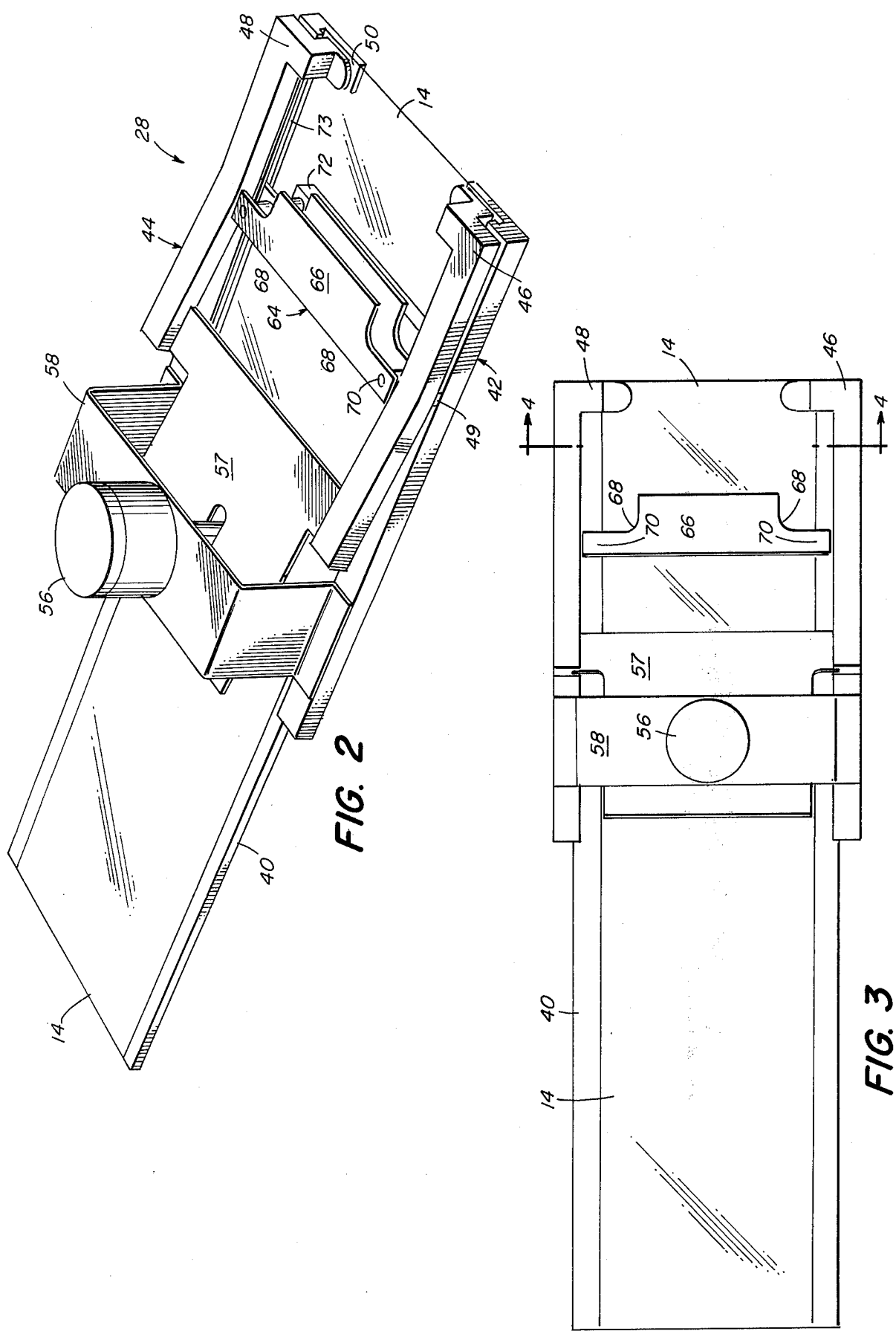

APPARATUS FOR APPLYING A FILM LID TO A CUP

BACKGROUND OF THE INVENTION

1. Field of the Invention

This invention relates generally to packaging equipment and more particularly is directed towards a new and improved apparatus for making and applying to a disposable drinking cup a lip of a heat sealable film material from a roll of material.

2. Description of the Prior Art

In our U.S. Pat. No. 4,078,360 there is disclosed an apparatus for lidding a disposable drinking cup with a film of thermoplastic sheet material. The apparatus includes a cup support adapted to raise a cup placed thereon into contact with a leading section of a thermoplastic film held by reciprocating gripping jaws. Mounted above the film along the axis of movement of the cup holder is a heating pad which comes down against the top of the film to press the film and seal it to the rim of the cup. Upon completion of this sealing operation, the cup drops down, the head moves up and the jaws retract to grip and draw out a fresh section of film in preparation for the next lidding operation. The apparatus is controlled by means of pneumatic circuit provided with logic modules and control switches in a cooperative arrangement.

It is an object of the present invention to provide improvements in a cup lidding apparatus of the sort disclosed in our prior patent. It is a more specific object of this invention to provide an improved film feed mechanism for improved control over the movement of the film. A further object of this invention is to provide a new and improved pneumatic control system for use in operating the apparatus.

SUMMARY OF THE INVENTION

This invention features an apparatus for applying a film of thermoplastic sheet material as a lid onto a disposable drinking cup, comprising a cup holder adapted to raise and lower the cup to and from a section of thermoplastic film held by a film advance mechanism and a reciprocating heat sealing head adapted to move in and out of heat sealing engagement with the film that has been drawn over the cup to seal the film onto the cup rim as a lid. The film advance mechanism includes a weighted film feeding stabilizer which rides on top of the film for keeping the film in a flat condition during sealing and feeding operations and allows fresh film to be readily threaded therethrough. The apparatus also includes an improved guideway comprised of a bed of an ultra high modecular weight polyethylene which enhances the travel of the film from the roll and the movement of the film advance mechanism.

This invention also features a pneumatic control system comprised of a reduced number of pneumatic control modules and control switches for operating the apparatus in a logical sequence.

BRIEF DESCRIPTION OF THE DRAWINGS

FIG. 2 is a view in perspective of the film advance mechanism, FIG. 3 is a top plan view thereof.

DETAILED DESCRIPTION OF THE PREFERRED EMBODIMENT

Figure 1:
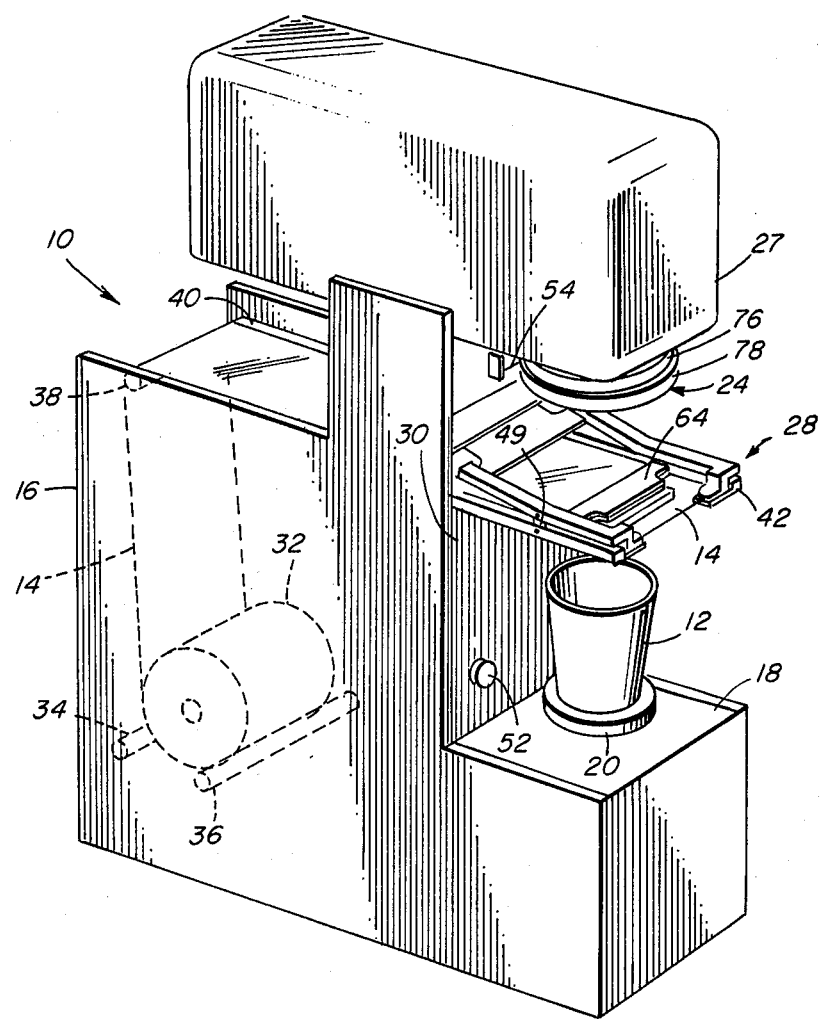
FIG. 1 is a view in perspective of a cup lidding apparatus made according to the invention.
Figure 4:
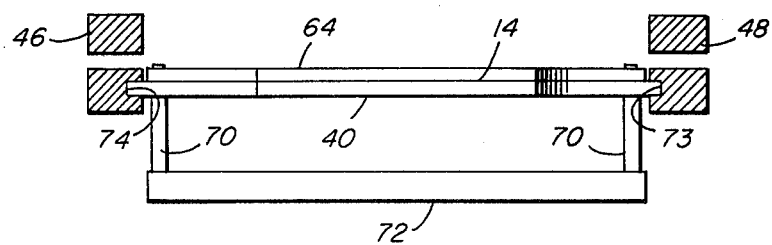
FIG. 4 is a cross-sectional view taken along the line 4—4 of FIG. 3, and, FIG. 5 is a schematic diagram of the pneumatic control system.

Referring now to the drawings and to FIG. 1 in particular, the reference character 10 generally indicates an apparatus for automatically applying to a disposable drinking cup 12 or similar container a film lid 14 that is somewhat over-sized to accommodate different cup sizes. The apparatus 10 is generally organized about a housing 16, preferably of a relatively narrow front profile to minimize the frontal space required on a food counter which normally is quite crowded. The housing includes a lower front shelf 18 on which is disposed a cup holder 20 adapted to reciprocate vertically under the action of a pneumatic piston and cylinder 22 mounted within the housing below the shelf 18. The piston of the cylinder 22 has a relatively long and variable stroke and, when actuated, provides a continuous upward lifting pressure so that cups in a variety of different heights will all be raised sufficiently to bring their rims into contact with the film. Located directly above the cup support 20 is a relatively wide, flat sealing head 24 adapted to reciprocate vertically along the same axis as the cup support 20 in order to heat seal the film 14 onto the rim of the cup 12 when the cup is in a raised position. The heat sealing head 24 is reciprocated by means of a pneumatic piston and cylinder 26 mounted to an upper overhanging shelf 27 near the top of the housing.

Disposed between the heat sealing head 24 and the cup support 20 is a film advance mechanism or carriage 28 adapted to reciprocate horizontally through a vertical front wall 30 of the housing in order to draw out a fresh section of lidding film provided in strip form and fed from a roll 32 of the film. The roll 32 is mounted within the housing and is supported by rollers 34 and 36 forming a cradle, with the film being drawn from the roll upwardly, around an abutment 38 and horizontally forward along a guideway platen 40. The leading end of the film is then engaged by the film advance mechanism which reciprocates in and out of the housing on each cycle of operation of the machine, drawing out each time a fresh section of film and holding it in position between the cup and heat sealing head where it can be heat sealed onto the cup rim. The film advance mechanism then retracts, engages the leading edge of the film and draws out a new section of film into lidding position.

The film advance mechanism includes a relatively fixed lower jaw assembly 42 and a relatively moveable upper jaw assembly 44. The lower jaw assembly includes a pair of forwardly extending, spaced, parallel arms with a flat L-shaped end portion which supports and engages the lower face and opposing corners of the free end of the film 14. The upper face of the film is gripped by the moveable upper jaw assembly 44 comprised of a pair of parallel rocker arms 46 and 48 extending directly above the arms of the lower jaw assembly and terminating in L-shaped outer end portions, each end provided with a frictional pad 50. The rocker arms 46 and 48 are pivoted to the lower frame assembly at pivot points 49. The pad 50 may be of rubber or similar material adapted to grip firmly the top corners of the leading edge of the film, clamping the film tightly against the lower frame assembly 42 and defining with it a jaw mechanism which opens and closes in predetermined timed sequence upon each cycle of the machine.

As shown in the drawings, the jaws are in the extended closed position holding the leading edge of the film extended and taut over the cup 12 in position prior to an operating cycle. The machine is cycled by the operator placing the cup 12 on the cup support 20 and pushing an actuating button 52. The machine will then automatically start a cycle in which the cup support 20 first raises the cup so that the rim of the cup will come up against the lower face of the film 14 while at the same time the heat sealing head will come down against the top face of the film, applying heat to the film along the line of contact with the cup rim causing the film to heat seal against the rim of the cup. In the same stroke, a heated wire 54 located rearwardly of the sealing head 24 and moveable with it, severs that section of film which has been heat sealed to the cup from the strip of film. When the operation has been completed, the head 24 retracts, the film advance mechanism opens its jaws by pivoting the rocker arms 46 and 48 as it retracts inwardly and the cup support 20 drops together with the cup.

The rocker arm movement is controlled by means of a small pneumatic piston and cylinder 56 mounted to the film advance mechanism and moveable with it. The piston and cylinder 56 drivingly engages a plate 57 fixed to the inner ends of the rocker arms 46 and 48 which extend diagonally upwards and to the rear, as best shown in FIGS. 1 and 2. The piston and cylinder 56 are mounted to a transverse frame 58 which rigidly connects to the arms of the lower frame assembly 42 to form a carriage moveable along the guideway platen 40 by means of a pneumatic piston and cylinder 60 mounted horizontally below the guideway platen and connected to the film advance mechanism by means of a union 62. When the film advance mechanism retracts, cylinder 56 is actuated to bias the rocker arms, opening the jaws of the mechanism and, when the mechanism reaches its extreme left hand position, the jaws are closed so that the leading edge of the film will be gripped tightly at both leading corners. The film advance mechanism then moves forwardly, drawing with it a fresh section of film.

Operatively associated with the film advance mechanism is a film stabilizer 64 mounted on the leading end of the guideway platen 40 for the purposes of holding the film in a flat smooth condition as it is fed forwardly by the gripping jaws and to prevent its displacement during such times as the film is not being gripped. The film is extremely thin and light and presents unusual problems of control since it is easily subject to accidential movement by virtue of the lightest touch or random movements of air. Since it is essential that the film be kept in a proper position in order to ensure that the gripping jaws will properly engage the corners of the film, the film stabilizer provides a steady, slidable grip on the film and holds the film once it has been severed as well as during a retraction stroke of the jaws.

The stabilizer is comprised of a top plate 66 which is flat and extends across the top of the film which is threaded in under the top plate 66 and over the top surface of the guideway platen 40. The plate 66 is positioned at the leading end of the guideway platen 40 and is formed with cutaway end portions 68 to form a forward profile matching that of the underlying forward end of the guideway platen 40. Extending downwardly from each side of the plate 66 are connecting rods or pins 70 which pass slidably through openings in the guideway platen 40 to engage a weighted cross bar 72 positioned about an inch below the bottom of the guideway platen 40. The cross bar 72 serves to provide a gravity weight for the plate 66 while the rods 70 maintain the plate in position while allowing limited upward movement of the plate whereby fresh film may be readily threaded through the stabilizer by merely raising the plate 66 sufficiently to pass the film under it. Once the film has been threaded through the stabilizer, the plate is allowed to drop back onto the film to hold the film firmly and smoothly in place yet allow it to slide easily therethrough during a film advance cycle. The cutaway portions 68 provide clearance to receive the inwardly facing ends of the jaws as best shown in FIG. 3. Thus, the film end will be approximately even with the forward edge of the plate and platen while the corners of the film will be clear for engagement by the gripping jaws upon a retraction stroke of the film advance mechanism.

The film advance mechanism slides in and out along the guideway platen 40 which is fixed in position on the housing. The sliding movement between the film advance mechanism and the guideway platen 40 is provided by means of inwardly facing grooves 72 and 73 formed along the inner faces of the lower jaw assembly 42. The grooves 72 and 73 slidably engage the longitudinal edges of the guideway platen 40 along the top of which the film is advanced. The guideway platen 40, in the preferred embodiment of the invention, is comprised of an ultra high molecular weight polyethylene such as that sold under the name CADCO HMW 1900. This material provides an ideal surface for movement of the film since it is extremely tough and durable, and presents a very smooth, waxy finish of a low frictional character. Thus, not only is the movement of the film facilitated over the guideway platen 40 but the lubricating characteristics of the material enhance the motion of the jaw advance mechanism which reciprocates at the forward end of the guideway.

The heat sealing head 24, in the preferred embodiment, is relatively wide and circular in order to accommodate a wide range of cup sizes. The heat sealing head made up of a metal backing plate 76 and a high strength silicon rubber pad 78 has been found to produce particularly satisfactory results. High strength silicone rubber such as that sold by the Continental Hard Rubber Co. under the name COHRLASTIC 9235, has been found to produce very satisfactory results. This material is operable in a wide range of temperatures from $-100°$ F. to $+500°$ F. and offers a proper amount of resilience so as to conform to the cup rim and produce a relatively wide heat seal between the film and the rim. Other, softer durometer silicon rubber material may also be used to advantage and can be made disposable for periodic replacement. The metal backing plate 76, in the preferred embodiment, is a heating ring sold under the mark TEMP-A-RING by Acra Electric Company of Schiller Park, Ill. A similar ring heater that has been found satisfactory is that sold under the trademark CHROMALOX by Edwin Wiegand Division of Emerson Electric Company of Pittsburg, Pa. Preferably, the head assembly is spring loaded for additional flexibility.

Figure 5:
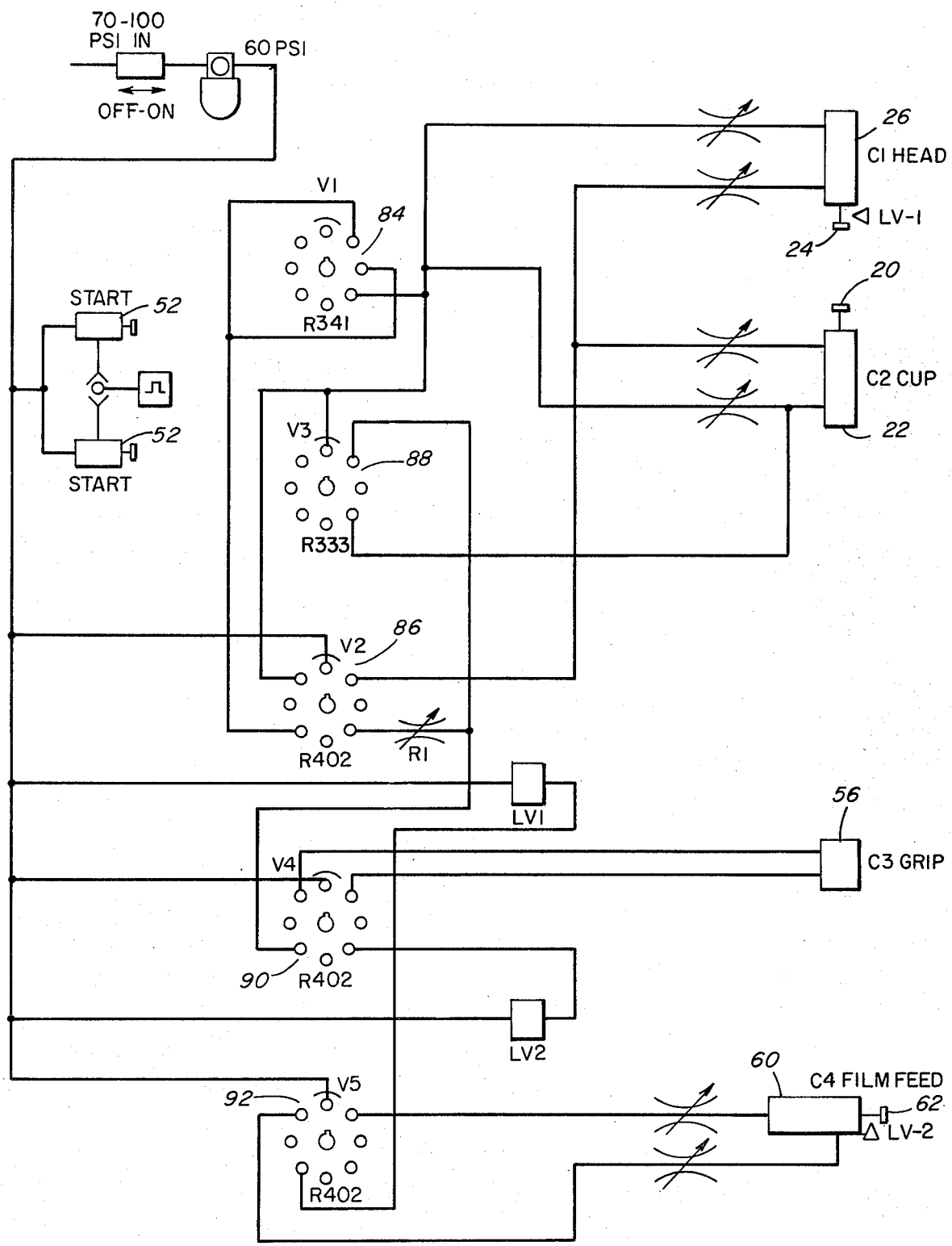

As is best shown in FIG. 5 the control system of the apparatus is pneumatically operated with the compressed air from the source 80 which is fed by a conduit 82 to a group of five air logic modules 84, 86, 88, 90 and 92. The module 84 responds to the pair of start buttons and is operatively connected to the heat sealing cylinder 26 and the cup raising cylinder 22. The module 88 controls the operation of the jaw mechanism cylinder 56 while the module 90 controls the cylinder 60 that reciprocates the jaw mechanism along the guideway platen 40. Various limit switches are provided, as shown.

The apparatus is extremely simple to operate and all that need to be done by the operator is to fill the cup 12 with whatever drink the customer has ordered. The operator then places the filled cup 12 on the cup holder 20 and pushes one of the starter buttons. Once this has been done, the machine cycles itself by causing the cup holder to raise the cup 12 against the prepositioned film 14. At the same time, the heat sealing head comes down to press the film against the rim of the cup, sealing the film against the cup rim. The head then retracts and the cup is lowered while the film advance mechanism cycles to draw out a fresh section of film for the next lidding operation. During the heat sealing operation, the section of film over the cup is severed from the film supply by means of the heated wire 54, producing the rectangular section of film which serves as the cup lid. Once the cup has been lowered, the operator may remove the cup and deliver it to the customer. The seal is sufficiently tight so that the cup may be inverted without its contents leaking and the film has sufficient strength to prevent bursting thereof. The lid may be removed by the customer by simply gripping one corner or edge of the film pulling it in over the cup in a peeling action. Insofar as the film is somewhat oversized a wide variety of cup sizes may be employed with the apparatus without adjustment. The film may be heat sealed to a wide range of cup sizes insofar as the face of the heat sealing head is relatively wide and circular and will engage and properly seal the film to a variety of different sizes of cups. Since the cup lifting mechanism has a relatively long stroke, and will provide continuous raising pressure when actuated, cups of different heights can be accommodated.

While the invention has been described with particular reference to the illustrated embodiment, numerous modifications thereto will appear to those skilled in the art. For example, instead of mounting the heat sealing head 24 for reciprocation it can be stationary and positioned in close proximity to the film so that the rim of the cup will bring the film against the head when the cup support raises the cup.

Having thus described the invention, what we claim and desire to obtain by Letters Patent of the United States is:

1. Apparatus for heat sealing a section of heat sealable film over the top of a cup, or the like, comprising
   (a) a cup holder adapted to reciprocate along a vertical axis,
   (b) a heat sealing and film severing head mounted in spaced relation above said holder,
   (c) a film advance mechanism mounted for movement in a horizontal plane between said holder and said head for drawing from a roll a leading section of film across said axis in position between said holder and head,
   (d) control means operatively connected to said holder, head and mechanism for raising said holder and a cup thereon upwardly against the lower face of said film section, to apply the upper face of said film section against said head to heat seal said film section to the rim of said cup and sever said section from said roll, then lowering said holder and cup, and actuating said mechanism to draw a fresh section of film into position,
   (e) said film advance mechanism including a carriage mounted for horizontal reciprocation from a retracted to an extended position,
   (f) said carriage including jaws and jaw actuating means adapted to open and close said jaws against said film in response to said control means whereby said jaws are closed while holding a section of film extended over said cup and open when said carriage retracts along the feed path of said film said jaws then closing to grip the leading edge of said film as said carriage extends to draw out a fresh section of film,
   (g) said carriage including a relatively fixed lower jaw assembly and a relatively movable upper jaw assembly, each assembly being formed with a pair of parallel arms extending forwardly of said carriage parallel to the side edges of said film,
   (h) said upper jaw assembly being pivotally connected to said lower jaw assembly whereby biasing movement applied at one end of said upper jaw assembly will open and close said jaw selectively,
   (i) said apparatus including a film stabilizer comprising a flat weighted plate mounted adjacent the path of travel of said film proximate to the retracted position of said jaws for sliding engagement with the upper surface of said film, said plate being restrained against horizontal movement but free for limited vertical movement above the path of said film, and,
   (j) means for biasing said upper jaw assembly,
   (k) said film stabilizer including a pair of spaced vertical rods slidably mounted to said carriage and engaging opposite side edges of said plate and a weighted member engaging the lower ends of said rods,
   (l) said plate being formed with a pair of notches in the forward edge thereof to receive the gripping ends of said jaws when said carriage is in a retracted position.

2. Apparatus according to claim 1 wherein said heat sealing head is mounted for reciprocating vertical movement along said vertical axis and is operatively connected to said control means.

* * * * *